United States Patent
Lee et al.

(10) Patent No.: US 9,216,652 B2
(45) Date of Patent: *Dec. 22, 2015

(54) REDOX FLOW BATTERY

(75) Inventors: Myung Jin Lee, Seoul (KR); Doo-yeon Lee, Yongin-si (KR); Duk-jin Oh, Seoul (KR); Joung-won Park, Seongnam-si (KR); Seung-sik Hwang, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 1006 days.

This patent is subject to a terminal disclaimer.

(21) Appl. No.: 13/287,352

(22) Filed: Nov. 2, 2011

(65) Prior Publication Data

US 2012/0107661 A1    May 3, 2012

(30) Foreign Application Priority Data

Nov. 3, 2010   (KR) .......................... 10-2010-0108797

(51) Int. Cl.
| | |
|---|---|
| *B60L 11/14* | (2006.01) |
| *H01M 8/18* | (2006.01) |
| *B60L 11/00* | (2006.01) |
| *B60L 11/18* | (2006.01) |
| *H01M 8/20* | (2006.01) |

(52) U.S. Cl.
CPC ............... *B60L 11/14* (2013.01); *B60L 11/005* (2013.01); *B60L 11/1879* (2013.01); *B60L 11/1887* (2013.01); *H01M 8/18* (2013.01); *H01M 8/188* (2013.01); *H01M 8/20* (2013.01); *Y02E 60/528* (2013.01); *Y02T 10/70* (2013.01); *Y02T 10/705* (2013.01); *Y02T 10/7022* (2013.01); *Y02T 10/7077* (2013.01); *Y02T 90/34* (2013.01)

(58) Field of Classification Search
None
See application file for complete search history.

(56) References Cited

U.S. PATENT DOCUMENTS

| | | | |
|---|---|---|---|
| 4,591,453 A | | 5/1986 | Kobayashi |
| 4,786,567 A | | 11/1988 | Skyllas-Kazacos et al. |
| 6,562,514 B1 | | 5/2003 | Kazacos et al. |
| 6,764,789 B1 | * | 7/2004 | Sekiguchi et al. ............ 429/105 |
| 8,481,192 B2 | * | 7/2013 | Sun et al. ...................... 429/105 |
| 8,642,202 B2 | * | 2/2014 | Sun et al. ...................... 429/105 |
| 2009/0017379 A1 | * | 1/2009 | Inatomi et al. ................ 429/213 |
| 2010/0112388 A1 | * | 5/2010 | Knuckey et al. ................ 429/13 |
| 2011/0189549 A1 | * | 8/2011 | Sun et al. ...................... 429/338 |
| 2011/0195283 A1 | * | 8/2011 | Sun et al. ........................ 429/80 |
| 2012/0135278 A1 | * | 5/2012 | Yoshie et al. ..................... 429/7 |
| 2012/0171530 A1 | * | 7/2012 | Lee et al. ......................... 429/70 |
| 2012/0171531 A1 | * | 7/2012 | Park et al. ....................... 429/70 |

FOREIGN PATENT DOCUMENTS

| | | | |
|---|---|---|---|
| JP | 2009-093843 | | 4/2009 |
| KR | 1020110088881 | * | 8/2011 |
| KR | 1020110089079 | * | 8/2011 |
| WO | WO 2010143634 A1 | * | 12/2010 |

OTHER PUBLICATIONS

Machine translation of KR1020110088881 (Aug. 2011), relied upon in the rejection.*
Machine translation of KR1020110089079 (Aug. 2011), relied upon in the rejection.*
Maron et al., 2,6-Bis(imidazol-2-ylidene)pyridine Complexes of Lanthanoides: A Theoretical Stud of the Bonding Sitution and Selective Complexation, 2009, Organometallics, 28, 3686-3690.*
Qinghua Liu, et al.; Non-aqueous Vanadium Acetylacetonate Electrolyte for Redox Flow Batteries; Elsevier; Electrochemistry Communications 11; Oct. 13, 2009; pp. 2312-2315.
Y. Matsuda, et al.; A Rechargeable Redox Battery Utilizing Ruthenium Complexes With Non-Aqueous Organic Electrolyte; Chapman and Hall Ltd.; Journal of Applied Electrochemistry 18; Apr. 10, 1988; pp. 909-914.

* cited by examiner

*Primary Examiner* — Eugenia Wang
(74) *Attorney, Agent, or Firm* — Cantor Colburn LLP (57) ABSTRACT

A redox flow battery includes a positive electrode electrolyte and a negative electrode electrolyte, each of which includes a metal-ligand coordination complex, in which a metal of a metal-ligand coordination complex of the positive electrode electrolyte is different from a metal of a metal-ligand coordination complex of the negative electrode electrolyte. Due to use of different metals in the positive and negative electrode electrolytes, the redox flow battery has high energy density and high charge and discharge efficiency.

13 Claims, 8 Drawing Sheets

PRIOR ART

REDOX FLOW BATTERY

CROSS-REFERENCE TO RELATED APPLICATION

This application claims the benefit of Korean Patent Application No. 10-2010-0108797, filed on Nov. 3, 2010 in the Korean Intellectual Property Office, the disclosure of which is incorporated herein in its entirety by reference.

BACKGROUND

1. Field

Aspects of the present disclosure relate to redox flow batteries, and in particular, to redox flow batteries having high energy density and high charge and discharge efficiency.

2. Description of the Related Art

Secondary batteries are high-efficiency energy storage systems and are used in a wide range of applications including small mobile devices and middle or large-capacity power storage devices. Also, secondary batteries are used as key components in semiconductor and liquid crystal fields, sound fields, and communication fields pertaining to portable mobile phones and notebook computers. Furthermore, recently, secondary batteries are used as power sources for hybrid vehicles.

Demand for energy storage systems to supply energy more stably and to have higher energy conversion efficiency is increasing, and recently, redox flow batteries are drawing attention as high output and highly durable secondary batteries that are particularly suitable for large-scale energy storage systems.

Unlike in other batteries, the active material of redox flow batteries is present not in a solid state but as ions in an aqueous state. The ions are oxidized and reduced at the positive electrode and the negative electrode, respectively, in order to store and generate electric energy.

That is, in a redox flow battery, the active material included in an electrode is dissolved in a solvent, that is, the active material is present in an electrolytic solution (solution). If a battery including a positive electrolytic solution and a negative electrolytic solution having different oxidation states is charged, an oxidation reaction occurs at the positive electrode and a reduction reaction occurs at the negative electrode, and the electromotive force of a battery is dependent upon the standard electrode potential level difference) ($E^0$) of the redox couple that forms the positive electrolytic solution and the negative electrolytic solution. Meanwhile, the electrolytic solution is supplied from an electrolytic solution tank by using a pump. A redox flow battery has an advantage of a typical battery, that is, a high oxidation-reduction reaction speed at surfaces of the positive electrode and the negative electrode, and an advantage of a fuel cell, that is, high power output characteristics.

Figure 1:
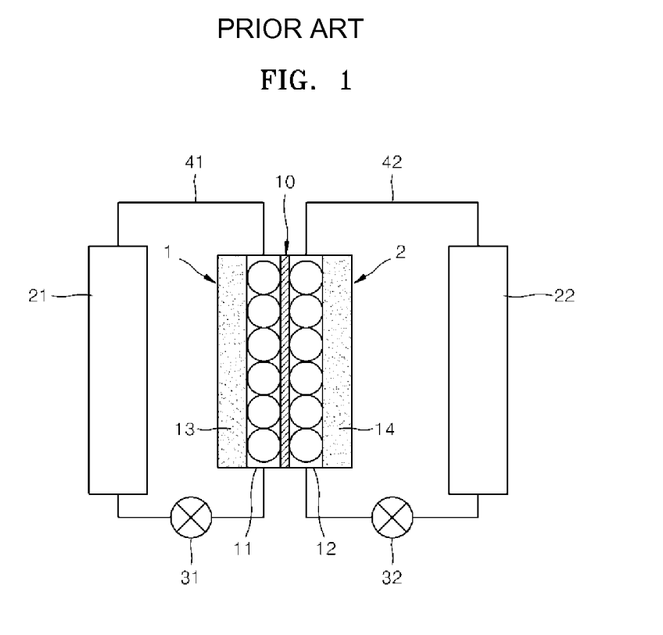
FIG. 1 is a schematic view of a conventional redox flow battery.
Figure 2A:
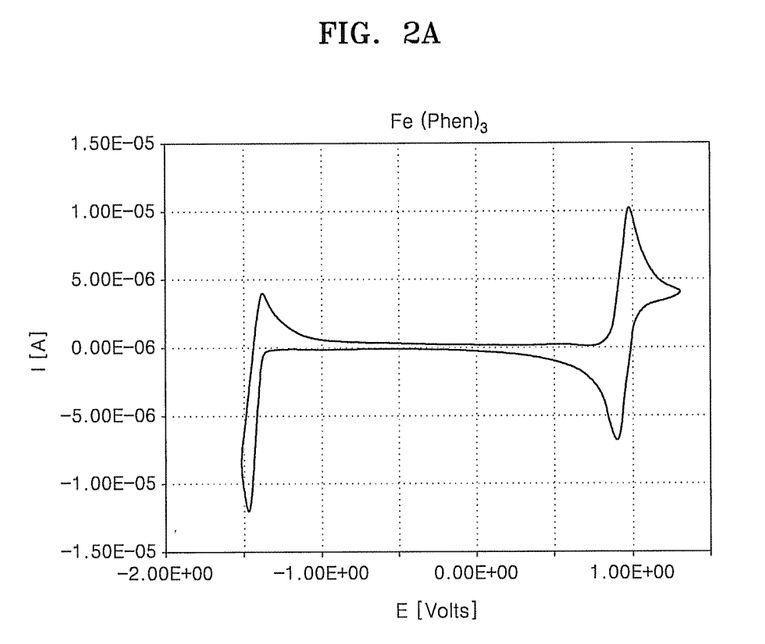
FIGS. 2A through 2D are graphs showing cyclic voltammetry measurement results of organic electrolytic solutions including electrolytes prepared according to Preparation Examples 1 through 4.
Figure 2B:
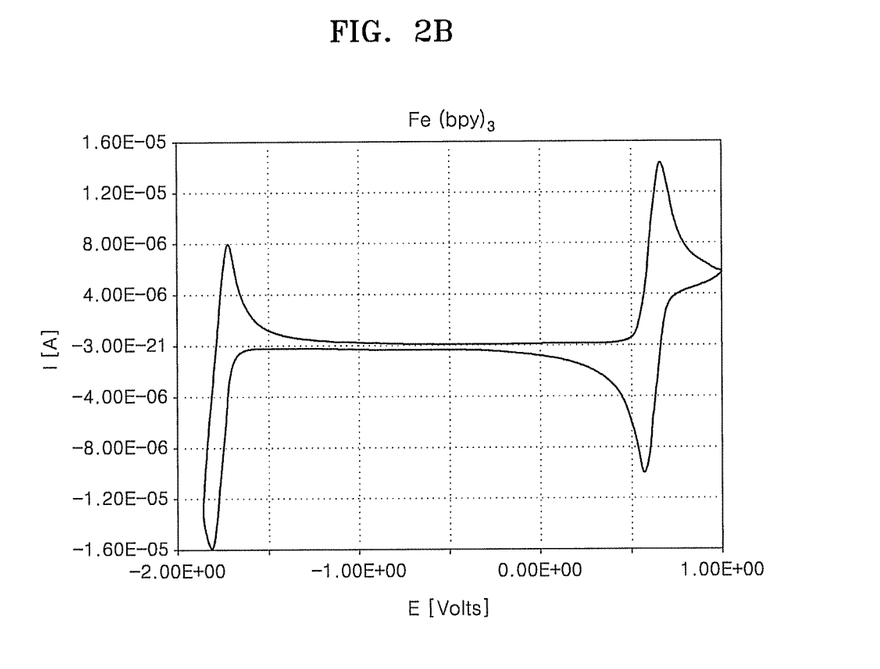
Figure 2C:
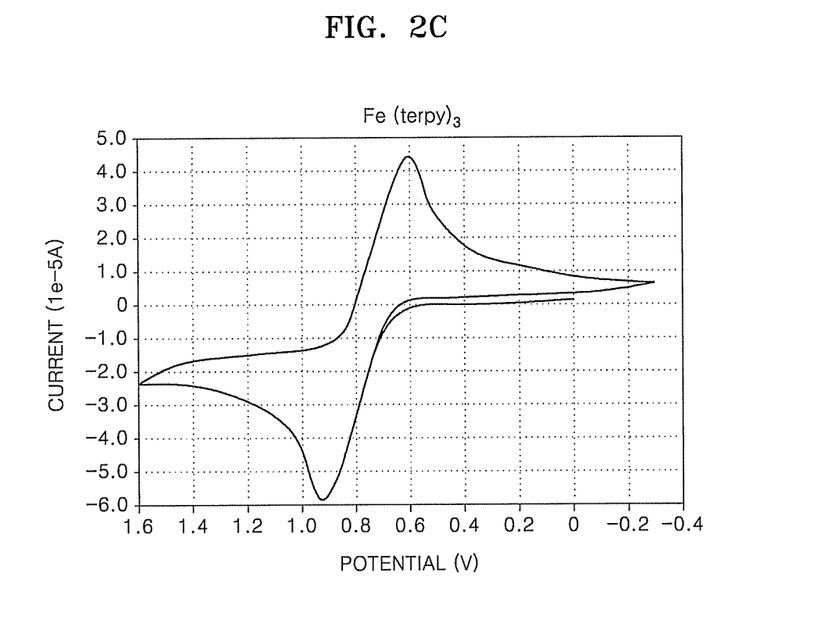
Figure 2D:
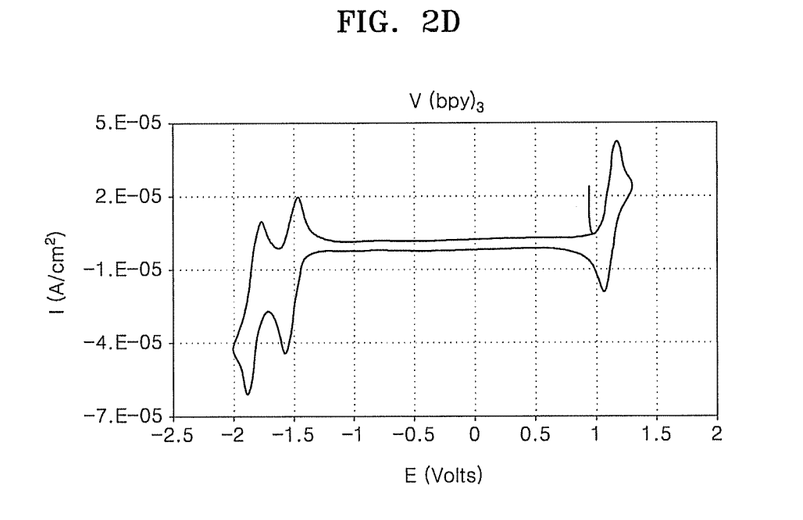

FIG. 1 is a schematic view of a conventional redox flow battery. Referring to FIG. 1, the conventional redox flow battery includes a positive electrode cell 1 and a negative electrode cell 2 separated by an ion exchange membrane 10. The positive electrode cell 1 and the negative electrode cell 2 respectively include a positive electrode 13 and a negative electrode 14. The positive electrode cell 1 is connected to a positive electrode tank 21 from which a positive electrolytic solution 11 is supplied through a pipe 41 and to which the positive electrolytic solution 11 is discharged through the pipe 41. Likewise, the negative electrode cell 2 is connected to a negative electrode tank 22 from which a negative electrolytic solution 12 is supplied through a pipe 42 and to which the negative electrolytic solution 12 is discharged through the pipe 42. The positive and negative electrolytic solutions 11 and 12, respectively, circulate through the pumps 31 and 32, and charging and discharging occurs according to valence electron change reactions at the positive electrode 13 and the negative electrode 14.

The ion exchange membrane 10 prevents mixing of the active material ion of the positive electrolytic solution 11 and the active material ion of the negative electrolytic solution 12 and allows only a charge carrier ion of a support electrolyte to pass.

SUMMARY

Aspects of the present invention provide redox flow batteries having high energy density and high charge and discharge efficiency.

According to an aspect of the present invention, a redox flow battery includes: a positive electrolytic solution; a negative electrolytic solution; and an ion exchange membrane located between the positive electrolytic solution and the negative electrolytic solution, wherein each of the positive electrolytic solution and the negative electrolytic solution includes a solvent, a support electrolyte, and a metal-ligand coordination complex, and the metal-ligand coordination complex included in the positive electrolytic solution and the metal-ligand coordination complex included in the negative electrolytic solution include different metals, and are each selected from the group consisting of an iron (Fe)-ligand coordination complex and a vanadium (V)-ligand coordination complex.

According to an embodiment of the present invention, a ligand contained in the metal-ligand coordination complexes may include at least one ligand selected from the group consisting of 2,2'-bipyridine, terpyridyl, ethylenediamine, propylenediamine, 1,10-phenanthroline, acetylacetonate, and N-heterocyclic carbene (NHC).

According to an embodiment of the present invention, the metal-ligand coordination complexes may be reversibly oxidized and reduced.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, redox flow batteries according to one or more embodiments will be described in detail. A redox flow battery according to an embodiment of the present invention includes a positive electrolytic solution, a negative electrolytic solution, and an ion exchange membrane interposed between the positive electrolytic solution and the negative electrolytic solution, in which each of the positive electrolytic solution and the negative electrolytic solution includes a solvent, a support electrolyte, and a metal-ligand coordination complex, and the metal-ligand coordination complex included in the positive electrolytic solution and the metal-ligand coordination complex included in the negative electrolytic solution include different metals and are each one selected from the group consisting of an iron (Fe)-ligand coordination complex and a vanadium (V)-ligand coordination complex.

The redox flow battery is discharged when the redox flow battery is connected to an external circuit and a current is supplied by the redox flow battery to the external circuit, and is charged when an external power source is connected to the redox flow battery and a current is supplied by the external power source to the redox flow battery.

In general, a positive electrolytic solution (catholyte) is charged when a redox couple is oxidized to the higher oxidation state between two oxidation states, and is discharged when the redox couple is reduced to the lower oxidation state between the two oxidation states. On the other hand, a negative electrolytic solution (anolyte) is reduced when a redox couple is discharged to the lower oxidation state between two oxidation states and is charged when the redox couple is oxidized to the higher oxidation state between the two oxidation states:

Positive Electrode $C^n \rightarrow C^{n-y} + ye^-$ (charge)

$C^{n-y} + ye^- \rightarrow C^n$ (discharge)

(C: positive electrode electrolyte)
Negative Electrode $A^{n-x} + xe^- \rightarrow A^n$ (charge)

$A^n \rightarrow A^{n-x} + xe^-$ (discharge)

(A: negative electrode electrolyte)

A conventional redox flow battery uses an aqueous solvent. Accordingly, the working potential thereof is limited to the water decomposition potential range, the driving voltage is low, and the energy density is low. However, if a non-aqueous solvent is used instead of the aqueous solvent, the working potential, the driving voltage, and the energy density are improved. However, since a conventional electrolyte has low solubility in the non-aqueous solvent, and precipitates when a metallic ion is reduced, it is difficult to obtain the desired energy density. Also, the more a battery is cycled, the greater a charge and discharge irreversibility capacity, and thus the lifetime of a cell is reduced.

In order to overcome the problems derived from use of an aqueous solvent, according to the present embodiment of the present invention, each of the positive electrolytic solution and the negative electrolytic solution includes an electrolyte including a metal-ligand coordination complex, and the metal-ligand coordination complex included in the positive electrolytic solution and the metal-ligand coordination complex included in the negative electrolytic solution include different metals.

Each of the positive and negative electrolytic solutions included in the redox flow battery according to an embodiment of the present invention includes a metal-ligand coordination complex selected from the group consisting of an iron (Fe)-ligand coordination complex and a vanadium (V)-ligand coordination complex.

That is, if the metal-ligand coordination complex included in the positive electrolytic solution is an iron-ligand coordination complex, the metal-ligand coordination complex included in the negative electrolytic solution is a vanadium-ligand coordination complex. On the other hand, if the metal-ligand coordination complex included in the positive electrolytic solution is a vanadium-ligand coordination complex, the metal-ligand coordination complex included in the negative electrolytic solution is an iron-ligand coordination complex.

Nonlimiting examples of a ligand contained in the metal-ligand coordination complexes are aromatic ligands and aliphatic ligands. According to an embodiment of the present invention, the ligand may include at least one ligand selected from the group consisting of 2,2'-bipyridine, terpyridyl, ethylenediamine, propylenediamine, 1,10-phenanthroline, acetylacetonate, and N-heterocyclic carbene (NHC). Nonlimiting examples of an NHC ligand are 2,6-bis(methyl imidazole-2-ylidene)pyridine, 1,3-dimesitylimidazole, 1,3-bis(2,5-diisopropylphenyl)imidazole, 1,3-dimethylimidazole, 1,3-di-tert-butylimidazole, 1,3-dicyclohexylimidazole, and 1-ethyl-3-methylimidazole. For example, the NHC ligand may be 2,6-bis(methyl imidazole-2-ylidene)pyridine.

The metal-ligand coordination complexes may be reversibly oxidized and reduced.

Nonlimiting examples of an iron-ligand coordination complex are an iron-2,2'-bipyridine coordination complex, an iron-1,10-phenanthroline coordination complex, and an iron-acetylacetonate coordination complex, examples of which are represented by formulae below.

Nonlimiting examples of a vanadium-ligand coordination complex are a vanadium-2,2'-bipyridine coordination complex, a vanadium-1,10-phenanthroline coordination complex, and a vanadium-acetylacetonate coordination complex, examples of which are represented by formulae below.

A counter anion of the metal-ligand coordination complexes may be $BF_4^-$, $PF_6^-$, $CF_3SO_3^-$, or $(CF_3SO_2)_2N^-$.

Nonlimiting examples of the solvent are an aqueous solvent, a non-aqueous solvent, and an ionic liquid. For example, the non-aqueous solvent may be a non-aqueous solvent.

Nonlimiting examples of the non-aqueous solvent are diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, and N,N-dimethyl acetamide.

The redox flow battery may further include a positive electrode cell including a positive electrode, a negative electrode cell including a negative electrode, a positive electrolytic solution tank that is fluid connected to the positive electrode cell, and a negative electrolytic solution tank that is fluid connected to the negative electrode cell.

The ion exchange membrane may be any of ion exchange membranes used in a conventional redox flow battery without limitations. Nonlimiting examples of a cation exchange membrane are a cation exchange membrane prepared by sulfonating a styrene-divinylbenzene copolymer, a cation exchange membrane prepared by introducing a sulfonic acid group to a copolymer of tetrafluoroethylene and perfluorosulfonylethoxyvinylether as a base, a cation exchange membrane including a copolymer of tetrafluoroethylene and perfluorovinylether having a carboxy group as a side chain, and a cation exchange membrane prepared by introducing a sulfonic acid group to an aromatic polysulfone copolymer as a base.

An anion exchange membrane may prevent mixing of a positive electrode electrolyte and a negative electrode electrolyte, may allow a counter anion of a metal-ligand coordination complex to be used as a charge carrier, may enable a sufficient concentration of a charge carrier to be obtained by using a relatively small amount of a support electrolyte, and may suppress transfer of an active material that is a cation to obtain relatively high charge and discharge efficiency and relatively high voltage efficiency.

For example, a cation exchange membrane may be used. When a conventional cation exchange membrane is used, a salt of a cation, such as $Na^+$, $Li^+$, or $H^+$, is used as a source for a charge carrier. However, solubility of such salts in an organic solvent is relatively low and when a relatively small amount of water is added thereto to increase solubility, a ligand becomes unstable and thus an oxidation and reduction reaction is not completely reversible. On the other hand, when an anion exchange membrane is used, a salt that has relatively high solubility in an organic solvent is available and thus if the salt is used, water is not added and decomposition of a ligand is prevented, and an oxidation and reduction reaction of a metal-ligand coordination complex is reversible, thereby improving cyclic characteristics and voltage characteristics.

For example, an anion exchange membrane may be used. Nonlimiting examples of an anion exchange membrane are an anion exchange membrane prepared by amination performed by introducing a chloromethyl group to a copolymer of styrene-divinylbenzene as a base, an anion exchange membrane prepared by substituting a copolymer of vinylpyridine-divinylbenzene with quaternary pyridium, and an anion exchange membrane prepared by amination performed by introducing a chloromethyl group to an aromatic polysulfone copolymer as a base.

Nonlimiting examples of a commercially available anion exchange membrane are NEOSEPTA-AMEX, NEOSEPTA-AHA, and NEOSEPTA-ACS, which are manufactured by ASTOM; Cybron ionan MA3475 manufactured by LANXESS; FAS, FAB, FAN, FAA, and FAD, which are manufactured by FuMa-Tech; and PC 100D, PC 200D, and PC-SA, which are manufactured by Polymerchemie Altmeier (PCA).

The support electrolyte does not directly join a reaction and maintains a charge balance between the positive electrolytic solution and the negative electrolytic solution.

The support electrolyte may include at least one material selected from the group consisting of $LiBF_4$, $LiPF_6$, $LiClO_4$, $LiCF_3SO_3$, $Li(CF_3SO_2)_2N$, tetraethylammonium tetrafluoroborate ($TEABF_4$) and tetrabutylammonium tertrafluoroborate ($TBABF_4$). If the support electrolyte is used instead of sulfuric acid, which is conventionally used, a non-aqueous solvent may be used to prepare an electrolytic solution.

The redox flow battery may be suitable for, in addition to conventional mobile phones and portable computers, applications requiring relatively high output and relatively high voltage, such as electric vehicles. When the redox flow battery may also be used in hybrid vehicles the redox flow battery may be used together with a conventional internal-combustion engine, a fuel cell, or a super capacitor. Also, the redox flow battery may be used in any other applications requiring relatively high output and relatively high voltage.

One or more embodiments will now be described in further detail with reference to the following examples. These examples are for illustrative purpose only and are not intended to limit the scope of the one or more embodiments.

PREPARATION EXAMPLE 1

$Fe^{2+}$-$(Phen)_3[BF_4]_2$—Transfer of One Electron 2.692 g of $FeSO_4 \cdot 7H_2O$ and 30 ml of methanol were loaded into a 100 ml round bottom flask and stirred for 5 to 20 minutes until the mixture became a solution state to prepare a $FeSO_4 \cdot 7H_2O$ solution. Separately, 5.767 g of 1,10-phenanthroline (Phen) and 60 ml of methanol were loaded into a 50 ml round bottom flask and stirred for 5 to 10 minutes until the mixture became a solution to prepare a 1,10-phenanthroline solution. The 1,10-phenanthroline solution was slowly added to the $FeSO_4 \cdot 7H_2O$ solution and the mixed solution was stirred until the mixed solution turned blue, violet, and then pink. Then, 5.490 g of $NaBF_4$ was added to the resultant solution and then the mixture was stirred for at least 30 minutes. The result was filtered and then the filtrate was washed with water and methanol several times and vacuum dried, thereby producing 3.456 g of $Fe^{2+}$-$(Phen)_3[BF_4^-]_2$.

PREPARATION EXAMPLE 2

$Fe^{2+}$-$(bpy)_3[BF_4]_2$—Transfer of One Electron 15.24 g (29.88 mmol) of $Fe(BF_4)_2 \cdot 6H_2O$ was loaded into a 100 ml round bottom flask and 50 ml of ethanol was added thereto, and then the mixture was stirred for 20 minutes until the mixture became a solution to prepare an $Fe(BF_4)_2 \cdot 6H_2O$ solution.

Separately, 14 g (89.64 mmol) of 2,2'-bipyridine (bpy) was loaded into a 100 ml round bottom flask and 80 ml of ethanol was added thereto, and then the mixture was stirred for 10 minutes until the mixture became a solution to prepare a 2,2'-bipyridine solution.

The 2,2'-bipyridine solution was slowly added to the $Fe(BF_4)_2 \cdot 6H_2O$ solution and the mixed solution was stirred for 3 hours at room temperature until the mixed solution gradually turned red. The result was filtered and then the filtrate was washed with water and 150 ml of ethanol three times and naturally dried and then dried in a vacuum oven, thereby producing 16.632 g (79.7%) of $Fe^{2+}$-$(bpy)_3[BF_4]_2$, a dark red solid.

PREPARATION EXAMPLE 3

$Fe^{2+}$-$[terpy]_2[BF_4]_2$—Transfer of One Electron 15.24 g (29.88 mmol) of $Fe(BF_4)_2 \cdot 6H_2O$ was loaded into a 100 ml round bottom flask and 50 ml of ethanol was added thereto. Then, the mixture was stirred for 20 minutes until the mixture became a solution to prepare an $Fe(BF_4)_2 \cdot 6H_2O$ solution.

Separately, 21 g (89.64 mmol) of 2,2':6',2''-terpyridine (MW: 233.27) (terpy) was loaded into a 100 ml round bottom flask and then 80 ml of ethanol was added thereto. Then, the mixture was stirred for 10 minutes until the mixture became a solution to prepare a terpyridine solution.

The terpyridine solution was slowly added to the $Fe(BF_4)_2 \cdot 6H_2O$ solution and the mixture solution was stirred for 3 hours at room temperature until the mixed solution gradually turned red. The result was filtered and then the filtrate was washed with water and 150 ml of ethanol three times and naturally dried and then dried in a vacuum oven, thereby producing 18.2 g of $Fe^{2+}$-$[terpy]_2[BF_4]_2$, a dark red solid.

PREPARATION EXAMPLE 4

$V^{3+}$-$(Phen)_3[BF_4]_2$—Transfer of One Electron 8.1 g of $VOSO_4 \cdot xH_2O$ and 200 ml of methanol were loaded into a 100 ml round bottom flask and the mixture was stirred for 60 minutes at room temperature until the mixture became a solution to prepare a $VOSO_4 \cdot xH_2O$ solution. Separately, 26.1 g of 1,10-phenanthroline and 80 ml of methanol were loaded into a 100 ml round bottom flask and the mixture was stirred for 30 minutes at room temperature until the mixture became a solution to prepare a 1,10-phenanthroline solution. The 1,10-phenanthroline solution was slowly added to the $VOSO_4 \cdot xH_2O$ solution and the mixed solution was stirred until the mixed solution turned blue and then red. Then, 23.0 g of $NaBF_4$ was added to the mixed solution and then stirred for at least 120 minutes. The result was left alone for 24 hours and then filtered, and the filtrate was washed with water and methanol several times and vacuum dried to prepare 15 g of $V^{3+}$-$(Phen)_3[BF_4^-]_2$.

PREPARATION EXAMPLE 5

$V^{3+}$-$(bpy)_3[BF_4]_2$—Transfer of One Electron 8.1 g (0.16 mol) of $VOSO_4 \cdot xH2O$ was loaded into a 100 ml round bottom flask and 100 ml of methanol was added thereto. Then, the mixture was stirred for 60 minutes until the mixture became a solution to prepare a $VOSO_4 \cdot xH_2O$ solution.

Separately, 25 g (0.51 mmol) of 2,2'-bipyridine was loaded into a 100 ml round bottom flask and then 50 ml of methanol was added thereto. The, the mixture was stirred for 3 hours until the mixture turned blue and then red to prepare a 2,2'-bipyridine solution.

The 2,2'-bipyridine solution was slowly added to the $VOSO_4 \cdot xH_2O$ solution and the mixed solution was stirred for 2 hours at room temperature until the mixed solution turned red. Then, 23 g (0.51 mol) of $NaBF_4$ was added to the mixed solution and left alone for 24 hours. The result was filtered, and the filtrate was washed with water and 100 ml of methanol five times, and then naturally dried and then dried in a vacuum oven, thereby producing 17 g of $V^{3+}$-$(bpy)_3[BF_4]_2$, a brown solid.

PREPARATION EXAMPLE 6

$V^{3+}$-$[acac]_2[BF_4]_2$—Transfer of One Electron $V^{3+}$-$[acac]_2[BF_4]_2$ was prepared by mixing vanadium (III) acetylacetonate, which was manufactured by Aldrich, and $TEABF_4$.

Cyclic Voltammetry

Current changes of the electrolytes prepared according to Preparation Examples 1 through 6 according to a potential change during 20 cycles were measured. In this experiment, the potential scan rate was 50 mV/s, and the potential scan range was −0.2 V to 1.5 V in the case of $Fe(Phen)_3(BF_4)_2$, −0.2 to 1.5V in the case of $Fe(bpy)_3(BF_4)_2$, −0.2 V to 1.5 V in the case of $Fe(terpy)_3(BF_4)_2$, −2.0V to 1.5V in the case of $V(Phen)_3(BF_4)_2$, −2.0 V to 1.5 V in the case of $V(bpy)_3(BF_4)_2$, and −2.5V to 1.0V in the case of $V(acac)_3(BF_4)_2$. A cell used to measure cyclic voltammetry included as a reference electrode an Ag/Ag+ electrode including 0.3M $AgNO_3$ dissolved in acetonitrile as a solvent, a working electrode formed of a carbon felt, and a counter electrode formed of platinum.

The test results are shown in FIGS. 2A through 2D. FIGS. 2A through 2D, respectively, correspond to the electrolytes prepared according to Preparation Examples 1 through 4. Referring to FIGS. 2A through 2D, an electrolyte including a metal-ligand coordination complex according to an embodiment of the present invention shows a reversible oxidation/reduction peak.

EXAMPLE 1

A positive electrolytic solution was prepared by dissolving 0.2 M $Fe(bpy)_3BF_4$ in 5 ml of acetonitrile and a negative electrolytic solution was prepared by dissolving 0.2 M $V(acac)_3BF_4$ in 5 ml of acetonitrile, and then charging was performed therewith. For each case, 1.0 M $TEABF_4$ salt dissolved in acetonitrile was used as a support electrolyte.

A carbon felt (Nippon Graphite, GF20-3, t=3 mm, A=5 cm×5 cm) was heat treated in an air atmosphere at a temperature of 500° C. for 5 hours to prepare a working electrode, and a non-flow type cell was manufactured and evaluated as follows. The ion exchange membrane used was a Na-conducting NAFION® membrane (product name: NAFION 117, and manufacturer: DuPont Corp.).

An insulator, a current collector, and a bipolar plate were stacked on a nut-integrated end plate. A 5 cm×5 cm square carbon felt electrode was cut in half to form a rectangular form, and then the rectangular electrode was inserted into a concave surface of the bipolar plate.

3 ml of the positive electrolytic solution prepared above was injected into a positive electrode carbon felt electrode prepared according to the method described above and 3 ml of the negative electrolytic solution prepared above was injected into a negative electrode carbon felt electrode prepared according to the method described above, and then the electrodes were assembled. A bolt having a disk spring was tightened in a diagonal order up to 1.5 Nm by using a torque wrench. After the assembling was completed, the remaining electrolytic solutions were, respectively, injected through injection holes of the electrodes, and then the injection holes were sealed with a polytetrafluoroethylene bolt. The polytetrafluoroethylene bolt having a gas leak hole was used for each bipolar plate.

EXAMPLE 2

A redox flow battery was manufactured in the same manner as in Example 1, except that $Fe(phen)_3(BF_4)_2$ was used instead of $Fe(bpy)_3(BF_4)_2$.

EXAMPLE 3

A redox flow battery was manufactured in the same manner as in Example 1, except that $Fe(terpy)_3(BF_4)_2$ was used instead of $Fe(bpy)_3(BF_4)_2$.

EXAMPLE 4

A redox flow battery was manufactured in the same manner as in Example 1, except that $V(bby)_3(BF_4)_2$ was used instead of $Fe(bpy)_3(BF_4)_2$ and $Fe(bpy)_3(BF_4)_2$ was used instead of $V(acac)_3(BF_4)_2$.

EXAMPLE 5

A redox flow battery was manufactured in the same manner as in Example 1, except that $V(bpy)_3(BF_4)_2$ was used instead of $Fe(bpy)_3(BF_4)_2$ and $Fe(phen)_3(BF_4)_2$ was used instead of $V(acac)_3(BF_4)_2$.

COMPARATIVE EXAMPLE 1

A 1 M $V^{2+}$ solution and a 1 M $V^{5+}$ solution were prepared from aqueous solutions containing 1M $VOSO_4$ (Aldrich, 97% hydrate) and 2M $H_2SO_4$(Aldrich, 96% solution) and used as a positive electrolytic solution and a negative electrolytic solution, respectively. A carbon felt (Nippon Graphite, GF20-3, t=3 mm, A=5 cm×5 cm) was used as an electrode and NAFION 117 substituted with a hydrogen ion was used as an ion exchange membrane. A method and sequence for assembling an all vanadium battery were the same as those in Example 1.

COMPARATIVE EXAMPLE 2

A redox flow battery was manufactured in the same manner as in Example 1, except that $Fe(bpy)_3(BF_4)_2$ was used instead of $V(acac)_3(BF_4)_2$.

Charge and Discharge Evaluation (Non-Flow Type Battery)

A charge and discharge test was performed on the redox flow batteries manufactured as described above at room temperature (25° C.).

Charge and discharge conditions were as follows and differ according to compositions. Charging was performed with a constant current of 5 to 10 mA at a voltage of 2.6 to 2.8 V. Discharging was performed with a constant voltage of 5 to 10 mA until a voltage reached 1.8 V.

Results are shown in Table 1.

TABLE 1

| | Positive electrolytic solution | Oxidation potential | Negative electrolytic solution | Reduction potential | Average OCV (V) |
|---|---|---|---|---|---|
| Example 1 | $Fe(bpy)_3$ | 0.68 | $V(acac)_3$ | −1.87 | 2.55 |
| Example 2 | $Fe(phen)_3$ | 0.64 | $V(acac)_3$ | −1.87 | 2.51 |
| Example 3 | $Fe(terpy)_3$ | 0.76 | $V(acac)_3$ | −1.87 | 2.63 |
| Example 4 | $V(bpy)_3$ | 1.12 | $Fe(bpy)_3$ | −1.68 | 2.80 |
| Example 5 | $V(bpy)_3$ | 1.12 | $Fe(phen)_3$ | −1.41 | 2.53 |
| Comparative Example 1 | V | 0.95 | V | −0.40 | 1.35 |
| Comparative Example 2 | $Fe(bpy)_3$ | 0.68 | $Fe(bpy)_3$ | −1.68 | 2.36 |

Figure 3:
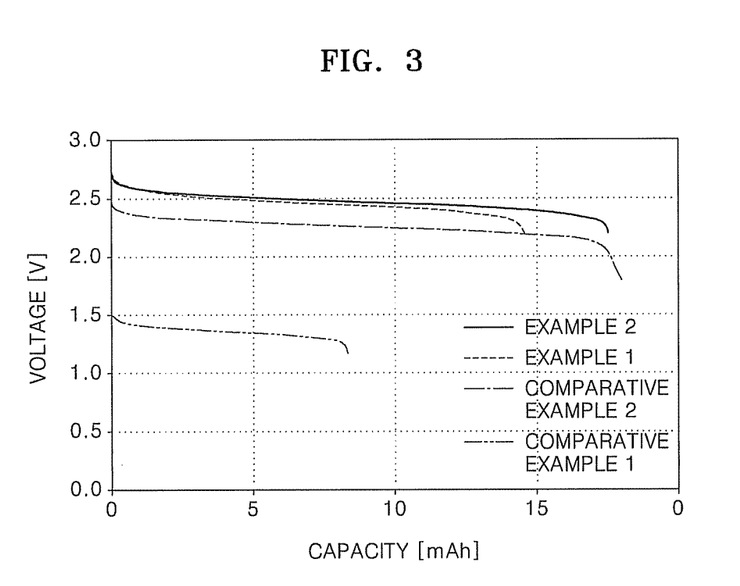
FIG. 3 is a discharge graph of redox flow batteries manufactured according to Examples 1 and 2 and Comparative Examples 1 and 2.

The charge and discharge test results are shown in FIG. 3 and Table 2 below. FIG. 3 is a discharge graph of the redox flow batteries manufactured according to Examples 1 and 2 and Comparative Examples 1 and 2.

TABLE 2

| | System | Cycle no. | Capacity (mAh) | | Average voltage (V) | | Efficiency (%) | |
| --- | --- | --- | --- | --- | --- | --- | --- | --- |
| | | | Charge | Discharge | Charge | Discharge | Charge and discharge | Energy |
| Comparative Example 1 | All VRB | 1 | 20.5 | 4.66 | 1.38 | 1.36 | 22.7 | 22.4 |
| Comparative Example 2 | Fe(bpy)/Fe(bpy) | 2 | 10.8 | 8.74 | 2.43 | 2.26 | 87.2 | 79.7 |
| Example 1 | Fe(bpy)/V(acac) | 2 | 16.0 | 14.6 | 2.53 | 2.46 | 92.8 | 89.8 |
| Example 2 | Fe(phen)/V(acac | 2 | 18.9 | 17.5 | 2.57 | 2.47 | 92.9 | 89.1 |

Referring to Table 2, charge and discharge efficiency and energy efficiency of the redox flow batteries manufactured according to Examples 1 and 2 were at least four times higher than those of the redox flow battery manufactured according to Comparative Example 1.

Regarding the charge and discharge test on the redox flow batteries manufactured according to Example 1 and 2, the intensity of current was halved due to high cell interior resistance. Cell resistance was measured according to an alternating impedance method, and solution resistance of the redox flow battery of Example 1 was 1.3Ω, which is 100 times greater than that of the redox flow battery of Comparative Example 1. Referring to FIG. 3, the open circuit voltage of the redox flow battery of Example 1 was 2.30 V, while that of the vanadium redox flow battery (all VRB) of Comparative Example 1 was 1.5 V, and the average discharge voltage of the redox flow battery of Example 1 was 2.46 V. Although the active material concentration of the redox flow battery of Example 1 was only 10% of the active material concentration of the vanadium redox flow battery (all VRB), the discharge amount of the redox flow battery of Example 1 was 1.8 times greater than that of the vanadium redox flow battery (all VRB).

Figure 4:
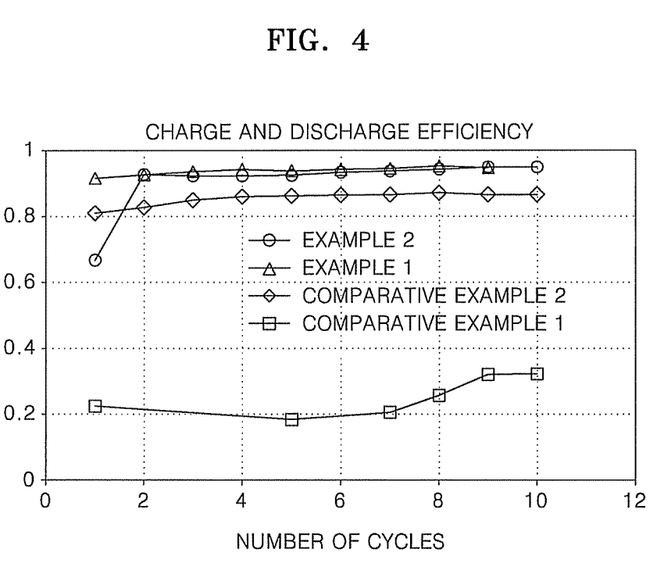
FIG. 4 is a graph of charge and discharge efficiency of redox flow batteries manufactured according to Examples 1 and 2 and Comparative Examples 1 and 2.

FIG. 4 is a graph of charge and discharge efficiency of redox flow batteries manufactured according to Examples 1 and 2 and Comparative Examples 1 and 2.

Figure 5:
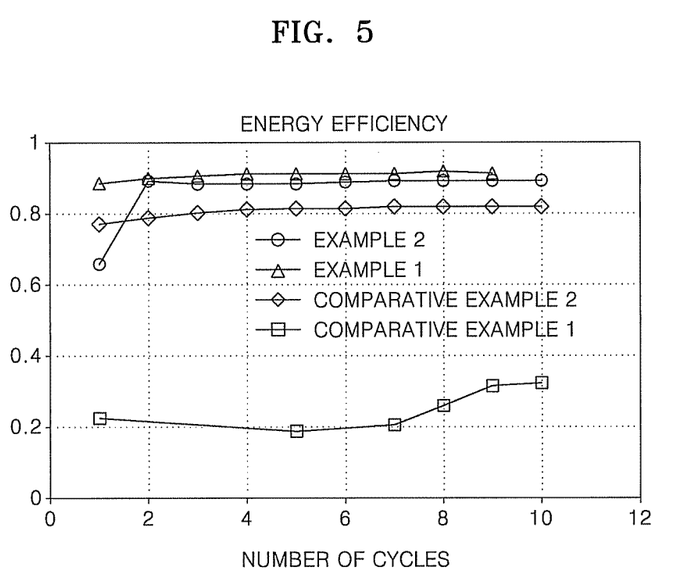
FIG. 5 is a graph of energy efficiency of redox flow batteries manufactured according to Examples 1 and 2 and Comparative Examples 1 and 2.

FIG. 5 is a graph of energy efficiency of redox flow batteries manufactured according to Examples 1 and 2 and Comparative Examples 1 and 2. Charge and discharge efficiency are represented by a percentage indicating the discharge amount divided by the charge amount, and energy efficiency is obtained by multiplying voltage efficiency with charge and discharge efficiency. Referring to FIG. 4, the charge and discharge efficiency of Example 1 was 92.8%, the charge and discharge efficiency of Example 2 was 92.9%, and the charge and discharge efficiency of Comparative Example 1 was 22.7%. That is, the charge and discharge efficiencies of Examples 1 and 2 were at least four times greater than the charge and discharge efficiency of Comparative Example 1.

Referring to FIG. 5, the energy efficiency of Example 1 was 89.78%, the energy efficiency of Example 2 was 89.19%, and the energy efficiency of Comparative Example 1 using an aqueous system was 22.4%. That is, the energy efficiencies of Examples 1 and 2 were at least four times greater than the energy efficiency of Comparative Example 1.

As described above, redox flow batteries according to the one or more of the above embodiments of the present invention have relatively high energy density and relatively high charge and discharge efficiency.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A redox flow battery comprising:
a positive electrolytic solution;
a negative electrolytic solution; and
an ion exchange membrane located between the positive electrolytic solution and the negative electrolytic solution,
wherein each of the positive electrolytic solution and the negative electrolytic solution comprises a solvent, a support electrolyte, and a metal-ligand coordination complex, and
wherein the metal-ligand coordination complex in the positive electrolytic solution is an iron(Fe)-ligand coordination complex and the metal-ligand coordination complex in the negative electrolytic solution is a vanadium(V)-ligand coordination complex; or the metal-ligand coordination complex in the positive electrolytic solution is the vanadium(V)-ligand coordination complex and the metal-ligand coordination complex in the negative electrolytic solution is the iron(Fe)-ligand coordination complex.

2. The redox flow battery of claim 1, wherein a ligand contained in the metal-ligand coordination complexes comprises at least one selected from the group consisting of 2,2'-bipyridine, terpyridyl, ethylenediamine, propylenediamine, 1,10-phenanthroline, acetylacetonate, and N-heterocyclic carbene (NHC).

3. The redox flow battery of claim 2, wherein the NHC is 2,6-bis(methylimidazole-2-ylidene)pyridine.

4. The redox flow battery of claim 1, wherein the iron-ligand coordination complex is an iron-2,2'-bipyridine, an iron-1,10-phenanthroline, or an iron-acetylacetonate coordination complex.

5. The redox flow battery of claim 1, wherein the vanadium-ligand coordination complex is a vanadium-2,2'-bipyridine, a vanadium-1,10-phenanthroline, or a vanadium-acetylacetonate coordination complex.

6. The redox flow battery of claim 1, wherein the iron (Fe)-ligand coordination complex and the vanadium (V)-ligand coordination complex are reversibly oxidized and reduced.

7. The redox flow battery of claim 1, wherein the solvent is a non-aqueous solvent.

8. The redox flow battery of claim 7, wherein the non-aqueous solvent comprises at least one solvent selected from the group consisting of diethyl carbonate, dimethyl carbonate, acetonitrile, γ-butyrolactone(GBL), propylene carbonate (PC), ethylene carbonate (EC), N-methyl-2-pyrrolidone (NMP), fluoroethylene carbonate, and N,N-dimethyl acetamide.

9. The redox flow battery of claim 1, wherein the counter anions of the iron (Fe)-ligand coordination complex and the vanadium (V)-ligand coordination complex are each independently $BF_4^-$, $PF_6^-$, $CF_3SO_3^-$, or $(CF_3SO_2)_2N^-$.

10. The redox flow battery of claim 1, wherein the support electrolyte is at least one electrolyte selected from the group consisting of $LiBF_4$, $LiPF_6$, $LiClO_4$, $LiCF_3SO_3$, $Li(CF_3SO_2)_2N$, tetraethylammonium tetrafluoroborate ($TEABF_4$) and tetrabutylammonium tertrafluoroborate ($TBABF_4$).

11. The redox flow battery of claim 1, wherein the ion exchange membrane is an anion exchange membrane.

12. The redox flow battery of claim 11, wherein the anion exchange membrane is an anion exchange membrane prepared by amination performed by introducing a chloromethyl group to a copolymer of styrene-divinylbenzene as a base, an anion exchange membrane prepared by substituting a copolymer of vinylpyridine-divinylbenzene with quaternary pyridium, or an anion exchange membrane prepared by amination performed by introducing a chloromethyl group to an aromatic polysulfone copolymer as a base.

13. The redox flow battery of claim 1, further comprising a positive electrode cell comprising a positive electrode, a negative electrode cell comprising a negative electrode, a positive electrolytic solution tank that is fluid connected to the positive electrode cell, and a negative electrolytic solution tank that is fluid connected to the negative electrode cell.

* * * * *